Oct. 21, 1947.    T. ZUSCHLAG    2,429,336
ELECTROMAGNETIC TESTING
Filed Nov. 19, 1942
Fig. 1,
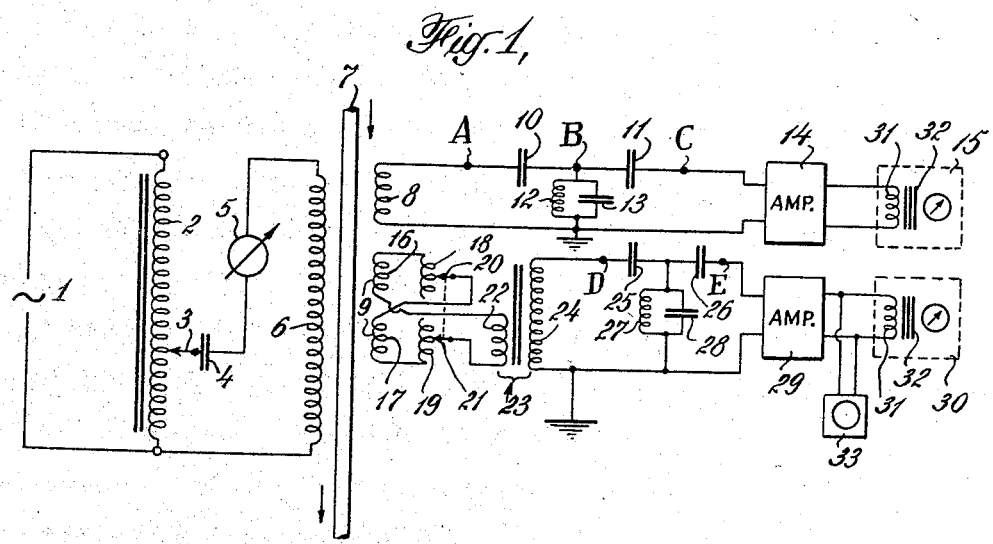
Fig. 2,
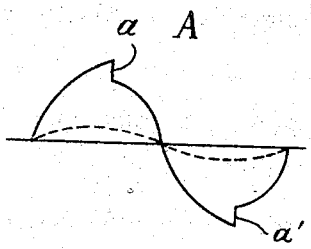
Fig. 3,
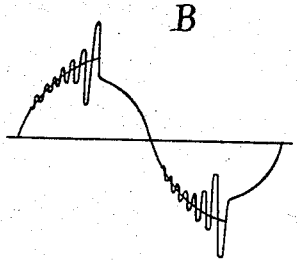
Fig. 4,
Fig. 5,
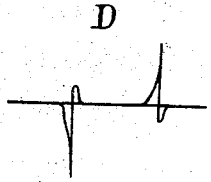
Fig. 6,
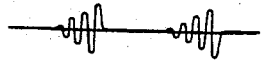
INVENTOR
THEODORE ZUSCHLAG
BY
Pennie, Davis, Marvin & Edmonds.
ATTORNEYS Patented Oct. 21, 1947

2,429,336

UNITED STATES PATENT OFFICE 2,429,336

ELECTROMAGNETIC TESTING

Theodore Zuschlag, West Englewood, N. J., assignor to Magnetic Analysis Corporation, Long Island City, N. Y., a corporation of New York Application November 19, 1942, Serial No. 466,117

12 Claims. (Cl. 175—183)

The present invention relates to methods and apparatus for electromagnetic testing of magnetic materials, especially elongated materials such as bar stock and tubing and has particular utility in testing tubing having thin walls.

In the past, elecromagnetic testing of metallic objects for flaws or variations has usually been carried on by energizing the object under test by an alternating magnetic field and investigating the resultant effect upon the base, or energizing, frequency or upon an harmonic thereof, by means of suitable exploring or test coils connected to an indicator. Such coils and the circuits and apparatus required for the detection, amplification and indication of the harmonic currents have been complicated and frequently unsatisfactory.

The method of the present invention differs from former testing procedures in that no attempt is made to analyze the resultant field reaction with regard to either the base frequency or an harmonic thereof. The invention is based, first, on the known fact that permeability and resistivity of ferrous materials vary with grade, size and hot or cold working operations, as well as with other physical conditions, and second, on the previously unrecognized fact that it is possible to derive and utilize for testing any of a large range of frequencies higher than the base frequency, and not merely harmonics, from the voltage induced in a pickup or test coil when the field of such coil includes magnetic material. These high frequencies appear to be the result of non-linear cyclic distortions or transients in the voltage wave set up in the test coil circuit. I have discovered that if this circuit includes a resonant load, the transients will create by shock excitation impact oscillations of a frequency determined by the effective values of inductance and capacitance in the circuit. Depending upon these values, the frequency of the impact oscillations might be within the range of, say, 200 to 2,000 cycles. The effective amplitude of these oscillations is varied by flaws or variations in the specimen under test. Furthermore, by the use of a novel test circuit, it is possible to create impact oscillations of the nature of momentary impulses which comprise the difference between two successive transients. By suitable apparatus these impulses may be indicated or recorded, or preferably these impulses may be caused to create less damped impact oscillations which are more readily indicated.

In accordance with the invention, the test circuit effectively includes a network of inductances and capacities which serve not only to determine the desired oscillation frequency of a resonant load, but also to filter out the base or energizing frequency which is not influenced by the flaws or variations to be indicated. The numerical value of the frequency of the impact oscillations has no particular significance in connection with the testing method of this invention, the significant function being the amplitude or phase, or both, of the transients and hence the effective amplitude of the resulting impulses or oscillations. Therefore the test circuits of the present invention are arranged to indicate or record the relative amplitude of the impact oscillations, as will be explained in connection with a description of a preferred embodiment of the invention.

Referring to the drawing,

Fig. 1 is a schematic wiring diagram of the system of the invention, and

Figs. 2 to 6, inclusive, illustrate typical voltage waves which prevail during operation of the system as measured between ground and the different points in the system indicated as A to E, inclusive, in the diagram of Fig. 1.

The system shown in Fig. 1 includes a suitable source of substantially undistorted alternating current 1, such as 60 cycles, connected to an autotransformer 2, the output voltage of which is adjustable by movement of secondary tap 3. The secondary circuit is completed from the tap through fixed condenser 4, ammeter 5, and exciting coil 6, and in this instance is tuned approximately to 60 cycles. This coil 6 which may, for example, comprise 600 turns of wire capable of carrying say, two amperes, preferably should be formed large enough to surround a specimen 7 to be tested which passes through it, as indicated by the arrows. Base frequencies from 60 to 400 cycles have been employed with satisfactory results, but the base frequency need not be limited to this range.

Electromagnetically coupled to the energizing circuit and to the specimen to be tested are two testing circuits of somewhat different characteristics. The first test circuit includes the circuit elements between coil 8 and indicator 15, and the second test circuit includes the circuit elements between coil 9 and indicator 30.

Pickup or test coils 8 and 9, which are energized by the field from exciting coil 6, are placed in inductive relation to the specimen 7. As shown in the diagram, coil 8 is constructed as a single coil, whereas coil 9 is comprised of two portions 16 and 17. Coils 8 and 9, preferably should both be arranged to enclose the specimen, in which event they should both be inside of coil 6 and be symmetrical therewith. Coil 8, which may comprise about 100 turns for example, may be located centrally between coil portions 16 and 17, but may, alternatively, be located asymmetrically with respect to coils 9 and 6.

Across the terminals of test coil 8 of the first test circuit is connected a high-pass filter network consisting of condensers 10 and 11 connected in series between a terminal of the test coil and a terminal of amplifier 14, and having their common point connected to ground through high inductance 12, with condenser 13 in shunt thereto. The purpose of this filter is to pass the high frequencies which are to be indicated or recorded and to suppress the low frequency of the power source 1, as well as to introduce a resonant load in the test circuit which causes the transients to create impact oscillations as previously mentioned. The elements introducing this resonant load may be said to comprise an oscillatory portion of the test circuit. The output of the filter network is connected to an amplifier 14, which, in turn, is connected through a coupling transformer 32 to indicator or recorder 15. Amplifier 14 is preferably of the untuned type and may comprise any suitable number of stages depending upon the type of tubes and coupling systems employed, as well as upon the total amplification required. Indicator or recorder 15 may comprise any device suitable for the purpose, and may, for example be similar to that described in U. S. Patent No. 2,152,690 to Thomas C. Hana wherein transformer core 11 in Fig. 1 of the Hana patent may be considered to be represented by core 32 of Fig. 1 of the present system, and wherein the elements of the circuit represented between secondary coil 15 and meter 43 of the Hana patent may be assumed to be included in device 15 of the present system.

In the second test circuit, which is included between exploring or test coil 9 and indicator or recorder 30, the two portions 16 and 17 of coil 9 are coupled, respectively, to secondary coils 18 and 19. Coils 16, 17, 18 and 19 may be wound each with about 200 turns, for example. In any event, they should preferably all have the same number of turns and be otherwise similar and should be located inside coil 6, but need not enclose the specimen, although it is usually preferable that they do so. In any event it is desirable that coil portions 16 and 17 be electrically substantially identical and that coils 18 and 19 be electrically substantially identical. Coils 18 and 19 are wound on the outside of coil portions 16 and 17, respectively, so that coils 16 and 18 wound one on top of the other are alongside of coils 17 and 19, wound one on top of the other. Coils 18 and 19 are preferably arranged with tapped connections 20 and 21, respectively, so that turns may be added to or subtracted from the total number on each of coils 18 and 19. For example, it is convenient that the taps be arranged so that 2, 4, 6, 8 or 10 turns out of 200 may be varied on each coil. It is preferable that the taps 20, 21 be uni-controlled so that the same number of turns on each coil will be simultaneously added or subtracted at any given setting. As can be seen in Fig. 1, the coils 16, 18 and 17, 19 are connected in series opposition, and this series circuit includes primary input winding 22 of a matching transformer 23. The purpose of transformer 23 is to couple the very low impedance of the test coil system to the higher impedance of the input circuit of amplifier 29. To this end, secondary 24 of transformer 23 should be of an impedance of the order of magnitude of the input circuit of the amplifier. Connected across the terminals of secondary coil 24 is a high-pass filter network consisting of condensers 25 and 26 connected in series between a terminal of the secondary and a terminal of the amplifier and having their common point connected to ground through high-inductance coil 27, with condenser 28 in shunt thereto. The purpose of this filter is similar to that of filter 10—13, viz., to pass the high frequencies and to suppress the low frequency of the power source 1, as well as to create oscillations as previously explained. However, because of the nature of the test coil system, this filter is not always required for the second test circuit 9—30.

Amplifier 29 is preferably of the untuned type, as is amplifier 14, and may comprise any suitable number of stages depending upon the type of tubes and coupling systems employed, as well as upon the total amplification required. Coupled to the output of amplifier 29 is an indicator or recorder 30 which should preferably be coupled to the amplifier by means of an input transformer 32 having a primary winding 31. An oscillograph 33 may, if desired, also be connected to the output of amplifier 29 (or of amplifier 14) so that the wave form of the voltage waves may be observed. Useful test information can also be secured by connecting both test circuits to a single oscillograph through the medium of an electronic switch (not shown) by which the waves of the two test circuits appear to be superimposed on the same oscillograph screen. Such oscillograph or oscillographs may be employed to indicate variations in amplitude and in phase of the oscillations. Indicator or recorder 30 may comprise any device suitable for the purpose and may, for example, be similar to that described in Hana U. S. Patent 2,152,690, as above referred to. If the filter network 25—28 be omitted from the second test circuit, it is important that an indicating device capable of "point analysis" such as that shown in the Hana patent be utilized. Another form of point analysis indicator is shown in Zuschlag U. S. Patent No. 2,144,476. From the foregoing it is to be understood that in the appended claims the term "means for indicating the effective amplitude of oscillations" is intended to include means for indicating phase or variations in phase.

Operation

The current through the ammeter 5 of the exciting circuit is determined by the magnitude of the voltage adjustably tapped off from autotransformer 2, the magnetic characteristic of coil 6 and the capacity of condenser 4. Assuming that at 60 cycles the value of the capacitive reactance of condenser 4 approximately equals that of the inductive reactance of coil 6, the circuit is broadly resonant, and relatively low voltage values will cause sufficient current to flow through coil 6. From one to two amperes is usually sufficient because high magnetization values tend to cause additional and confusing distortions in the 60 cycle wave. Assuming further no specimen or material under test in test coil 8, the voltage induced in coil 8 will approximate the undistorted wave form shown in Fig. 2 by the dash line. This wave form is substantially that of the 60 cycle source, and will be indicated by an oscillograph connected between ground and point A of the first test circuit illustrated in the upper part of Fig. 1. If now a specimen of magnetic material, such as steel or iron bars or tubes, be inserted in inductive relation to coils 6 and 8, the wave form at point A changes to that shown in Fig. 2 by the full line. This wave form is typical of most uniform ferrous solids without flaws and is especially significant with regard to the pronounced cyclic distortion transients indicated at $a$ and $a'$. These cyclic transients vary in form, magnitude or phase, or any combination thereof, with structure, shape and condition of the specimen, and thus may be utilized as a criterion of investigation when inspecting or testing magnetic material with respect to any of the mentioned characteristics. Prior to the present invention it was known that ferrous materials produced wave form distortions, but no practical application thereof to testing methods has been employed.

The wave form at point B of Fig. 1 is illustrated in Fig. 3. Here it will be observed that the cyclic distortion transients $a$ and $a'$ of Fig. 2 have set off trains of damped impact oscillations superimposed upon, but of much higher frequency than, the current induced by coil 6. The effective amplitude of these impact oscillations varies with the character of the distortion transient and thus is herein used as a measure of this transient.

The frequency of the impact oscillations is determined by the constants of the elements of the high-pass filter, 10—13. These elements would usually be of fixed values in commercial equipment, although any of them could be variable, if desired. Slight changes in these values vary the frequency of the oscillations without materially affecting the performance of the filter in suppressing low-frequency components, as indicated in Fig. 4 which represents the voltage wave form between ground and point C. It should be noted that the frequency of the impact oscillations need not be and usually is not an harmonic of the base frequency, but may be adjusted to any other value. Employing a 60 cycle energizing wave, for example, it is practicable to set up impact oscillations of from 200 to 2,000 cycles, as previously mentioned, but if a higher base frequency be employed the oscillation frequency should be proportionately higher and might be 8,000 cycles or more.

The magnitude of the high-frequency or oscillation voltage thus produced is ordinarily too low to operate a suitable indicator directly, but may be increased to any desired value by means of an untuned amplifier 14. For instance, the root-mean-square value of the fundamental voltage between ground and point A was measured in one system at 15 volts, while the maximum impact oscillation voltage at point C was only 0.75 volt, and this voltage in turn was amplified by a single stage of amplification to equal the fundamental voltage.

The operation of the second test circuit illustrated in the lower part of Fig. 1 is basically similar to that above described, but this circuit includes certain refinements which make it more sensitive and applicable for testing variations or defects of a different nature from those responded to by the first test circuit. It has already been mentioned that coil portions 16 and 17 are substantially identical and the pair of coils 18, 19 may be electrically substantially identical, respectively, and that they are connected in series opposition. Thus, assuming coil portions 16 and 17 are coupled symmetrically to energizing coil 6, no current will normally flow through primary coil 22 of transformer 23 when no specimen is within the field of the pickup coil 9. When a specimen passing through the field is free from defects and variations transients will be set up as before, but because of the balanced test coil system employed the wave created will comprise merely a momentary impulse which is actually the differential of two simultaneous transients. The wave form of such a typical impulse or impulse differential as observed at point D of Fig. 1 is shown in Fig. 5. In this event substantially no voltage variation will be measured between ground and point D of Fig. 1 so that an oscillograph connected between ground and point D will show a straight horizontal line. However, it is preferable to arrange these coils so that they are not completely balanced in order that a small differential wave will be transmitted to facilitate the adjustment of the apparatus. As a variation or defect in the material of the specimen moves through the fields of portions 16, 17 of coil 9 the normal condition of substantial balance will be upset, the amplitude of the impulse will increase, and increased current will flow through primary coil 22. After the impulse passes through the high-frequency filter network 25—28 the resulting wave form of the oscillation at E of Fig. 1 is illustrated in Fig. 6.

From Fig. 5 it will be observed that even before the current passes through the high-frequency filter the wave form does not include the low-frequency component as does that of Fig. 3, because the low-frequency component has already been substantially eliminated in the balanced test coil system. However, the inclusion of the filter 25—28 is usually desired, because, as shown by comparison of Figs. 5 and 6, it tends to decrease the decrement of the impulses and makes practicable the indication or measurement of the RMS values thereof by means of comparatively simple and well known apparatus. Because of the absence of low-frequency components in the second test circuit arrangement, the oscillations to be indicated or recorded may be greatly amplified in order to make the system as sensitive as desired. In certain instances the defect in the material under test may be of such nature as to introduce a slight 60 cycle component into matching transformer 23 regardless of the balance in the pickup coil system. In this event filter 25—28 would tend to suppress such undesired low-frequency component as described in connection with filter 10—13 of the first test circuit.

For both of the above-mentioned reasons it is usually preferable to include the high-frequency filter network 25—28, but if it be omitted the system of the second test circuit would still be operative, although in that case an indicator 30 capable of point analysis should be employed because of the high decrement of the resulting momentary impulse, as shown in Fig. 5.

The first test circuit shown at the upper part of Fig. 1 is especially useful in indicating general changes, such as the difference between one bar and another, or one length of tube and another, as distinguished from localized variations or defects within a single bar or tube. As an example of such general changes may be mentioned variations in "heat," i. e., variations in structure and stress resulting from the treatment which the material receives before and during rolling or drawing. The presence of such variations is important in later machining operations even though chemical analysis might indicate no variation. The system of the second test circuit is especially effective in detecting localized defects or variations within a single bar or tube, such as soft or other conditions, especially near the surface, or in thin-walled tubing.

What is claimed is:

1. In a system for testing magnetic material, an energizing winding, means for energizing said winding with low-frequency alternating current, a test circuit comprising a test coil system including at least four coils of which a first coil is connected in series opposition to a second coil, said second coil is connected in series opposition to a third coil, said third coil is connected in series opposition to a fourth coil, and said fourth coil is connected in series opposition to said first coil, said first and third coils being arranged to be in electromagnetic relation to a specimen of magnetic material under test, said first and third coils being electrically substantially identical, and said second and fourth coils being electrically substantially identical, said first and second coils being electromagnetically coupled together and said third and fourth coils being electromagnetically coupled together, said circuit comprising also an electrical network including tuning elements serving effectively to tune the portion of said circuit in which said network is connected to comprise an oscillatory portion resonant at a frequency considerably higher than said low frequency, and means coupling said test coil system to said network whereby distortions in wave form of said alternating current in said coil system generate impact oscillations at said higher frequency in said tuned portion, an amplifier coupled to said test circuit for amplifying said impact oscillations, and means energized by said amplifier for indicating the effective amplitude of said impact oscillations.

2. In a system for testing magnetic material according to claim 1, means for adjusting the effective inductance of each of said second and fourth coils simultaneously and to the same extent.

3. A system for testing magnetic material according to claim 1, wherein said first and third coils comprise windings of the same number of turns, and unitary means are provided for simultaneously adjusting the number of turns of each of said second and fourth coils.

4. In a system for testing magnetic material, an energizing coil, means for energizing said coil with low-frequency alternating-current, a test coil, both of said coils being arranged to be in electromagnetic relation to a specimen of magnetic material under test, a coupling transformer including a primary winding and a secondary winding, and a test circuit including a test coil system comprising in series connection said test coil, two secondary coils and said primary winding, said test coil comprising two similar coil portions each coil portion being coupled to one of said secondary coils in opposing relation, means for adjusting the number of effective turns on each of said secondary coils, an amplifier connected to the secondary of said coupling transformer, means including said coupling transformer for effectively matching the impedance of said test coil system to the effective input impedance of said amplifier, and means coupled to the output of said amplifier for indicating variations in impulses amplified by said amplifier.

5. In a system for testing magnetic material, an energizing coil, means for energizing said coil with low-frequency alternating-current, a test coil, both of said coils being arranged to be in electromagnetic relation to a specimen of magnetic material under test, and a test circuit connected to said test coil, said circuit including a filter network having a series branch comprising two condensers connected together in series in said circuit and a parallel branch comprising inductance and capacitance connected together in parallel between the junction of said condensers and the opposite side of said circuit, said network being proportioned to filter out current at said low frequency, elements in said network serving effectively to tune a portion of said circuit in which said network is connected to comprise an oscillatory portion having an oscillation frequency considerably higher than said low frequency, whereby to generate impact oscillations at said higher frequency, means coupled to said test circuit for amplifying oscillations occurring in said oscillatory portion of said test circuit at said oscillation frequency, and means energized from said amplifier means for indicating variations in the effective amplitude of said impact oscillations.

6. The method of testing magnetic material which comprises subjecting successive portions of said material to an alternating-current field of low frequency and low intensity, simultaneously coupling said portions of material electromagnetically to a test circuit so as to induce in said circuit voltage waves having non-linear cyclic distortions when the successive portions of the material differ in magnetic properties, creating by shock excitation due to said cyclic distortions impact oscillations of a frequency higher than that of said low frequency, and indicating variations in effective amplitude of said impact oscillations.

7. The method of testing magnetic material which comprises subjecting successive portions of said material to an alternating-current field of low frequency and low intensity, simultaneously coupling said portions of material electromagnetically to a test circuit such as to induce simultaneously in said circuit two voltage waves modified by transients, creating in said circuit a differential of said two transients, eliminating from said circuit substantially all voltage differentials except said transient differential, and indicating variations in the instantaneous value of said transient differential as a measure of said transients.

8. The method of testing magnetic material which comprises subjecting successive portions of magnetic material to an alternating-current field of low frequency and low intensity, simultaneously coupling said portions of material electromagnetically to a test circuit such as to induce in said circuit at least two voltage waves modified by transients, eliminating from each wave the carrier portion to leave the transient portion thereof, establishing a transient differential by electrically subtracting the transient portion of one wave from the transient portion of the other wave and indicating variations in the instantaneous value of said transient differential as a measure of said transients.

9. The method of testing magnetic material which comprises subjecting successive portions of said material to an alternating-current field of low frequency and low intensity, simultaneously coupling said portions of material electromagnetically to a test circuit such as to induce simultaneously in said circuit two voltage waves modified by transients which vary in form due to flaws or defects in the material, whereby a flaw or defect in one portion of the material will result in a change in the form of at least one of said transients, eliminating from said circuit substantially all voltage differentials except the differential of said transients, and indicating variations in the value and the form of said transient differential as a measure of said flaws or defects.

10. The method of testing magnetic material which comprises subjecting successive portions of said material to an alternating-current field of low frequency and low intensity, simultaneously coupling said portions of material electromagnetically to a test circuit such as to induce simultaneously in said circuit two voltage waves modified by transients which are due to changes in magnetic characteristics of successive portions of the material, and to create in said test circuit a voltage differential proportional solely to the differential in transient effects due to said change in characteristics, and indicating variations in the value of said voltage differential as a measure of said change in magnetic characteristics.

11. The method of testing magnetic material which comprises subjecting a given portion of said material to an alternating-current field of low intensity and of a frequency of the order of 60 cycles, simultaneously coupling said portion electromagnetically to a test circuit such as to induce in said circuit voltage waves having non-linear cyclic distortions of the nature of transients when the successive portions of the material differ in magnetic properties, creating impact oscillations of a frequency of the order of 200 to 2,000 cycles, and indicating variations in effective amplitude of said impact oscillations.

12. The method of testing magnetic material which comprises subjecting a given portion of said material to an alternating-current field of low frequency and low intensity, coupling said portion electromagnetically to a test circuit such as to induce in said circuit voltage waves having non-linear cyclic distortions when the successive portions of the material differ in magnetic properties, balancing out in said test circuit voltage of said low frequency, creating by shock excitation due to said cyclic distortions impact oscillations of a frequency higher than that of said low frequency, and indicating variations in effective amplitude of said impact oscillations.

THEODORE ZUSCHLAG.

REFERENCES CITED

The following references are of record in the file of this patent:

UNITED STATES PATENTS

| Number | Name | Date |
| --- | --- | --- |
| 2,028,486 | Zuschlag | Jan. 21, 1936 |
| 2,207,592 | Lenk | July 9, 1940 |
| 2,102,450 | Zuschlag | Dec. 14, 1937 |
| 1,782,462 | Chappuzeau et al. | Nov. 25, 1930 |

FOREIGN PATENTS

| Number | Country | Date |
| --- | --- | --- |
| 98,935 | Austria | Dec. 27, 1924 |
| 539,295 | Germany | Nov. 27, 1931 |